US008635602B2

(12) United States Patent
Haviv et al.

(10) Patent No.: US 8,635,602 B2
(45) Date of Patent: Jan. 21, 2014

(54) VERIFICATION OF INFORMATION-FLOW DOWNGRADERS

(75) Inventors: Yinnon Avraham Haviv, Beerotaim (IL); Roee Hay, Haifa (IL); Marco Pistoia, Amawalk, NY (US); Adi Sharabani, Ramat Gan (IL); Takaaki Tateishi, Kanagawa-ken (JP); Omer Tripp, Har-Adar (IL); Omri Weisman, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 12/843,308

(22) Filed: Jul. 26, 2010

(65) Prior Publication Data

US 2012/0023486 A1    Jan. 26, 2012

(51) Int. Cl.
*G06F 9/44* (2006.01)

(52) U.S. Cl.
USPC ............................. 717/126; 717/131; 717/132

(58) Field of Classification Search
None
See application file for complete search history.

(56) References Cited

U.S. PATENT DOCUMENTS

| | | | |
|---|---|---|---|
| 5,790,778 A * | 8/1998 | Bush et al. ..................... 717/132 |
| 6,275,976 B1 * | 8/2001 | Scandura ....................... 717/126 |
| 7,240,332 B2 * | 7/2007 | Berg et al. ..................... 717/126 |
| 7,293,175 B2 * | 11/2007 | Brown et al. ................. 713/166 |
| 7,392,545 B1 * | 6/2008 | Weber et al. ................... 726/25 |
| 7,530,107 B1 | 5/2009 | Ono et al. ....................... 726/25 |
| 7,546,588 B2 * | 6/2009 | Dickenson .................... 717/131 |
| 7,937,692 B2 * | 5/2011 | Drepper ........................ 717/140 |
| 8,087,004 B2 * | 12/2011 | Sims, Jr. ........................ 717/126 |
| 8,095,912 B2 * | 1/2012 | Giuseppini .................... 717/126 |
| 8,209,667 B2 * | 6/2012 | Eisner et al. .................. 717/132 |
| 8,214,795 B2 * | 7/2012 | Cheriton ........................ 717/126 |
| 8,266,606 B2 * | 9/2012 | Dickenson .................... 717/131 |
| 8,307,353 B2 * | 11/2012 | Wright et al. .................. 717/132 |

(Continued)

OTHER PUBLICATIONS

Wassermann, Su, "Sound and Precise Analysis of Web Applications for Injeciton Vulnerabilities", 2007, ACM; [retrieved on Feb. 12, 2013]; Retrieved from Internet <URL:http://citeseerx.ist.psu.edu/viewdoc/download?doi=10.1.1.129.4964&rep=rep1&type=pdf>;pp. 1-10.*

(Continued)

*Primary Examiner* — Thuy Dao
*Assistant Examiner* — Xi D Chen
(74) *Attorney, Agent, or Firm* — Harrington & Smith; Louis J. Percello

(57) ABSTRACT

A method includes determining grammar for output of an information-flow downgrader in a software program. The software program directs the output of the information-flow downgrader to a sink. The method includes determining whether the grammar of the output conforms to one or more predetermined specifications of the sink. The method includes, in response to a determination the grammar of the output conforms to the one or more predetermined specifications of the sink, determining the information-flow downgrader is verified for the sink, wherein determining grammar, determining whether the grammar, and determining the information-flow downgrader are performed via static analysis of the software program. Apparatus and computer program products are also disclosed. An apparatus includes a user interface providing a result of whether or not output of an information-flow downgrader in the software program conforms to one or more predetermined specifications of a sink in the software program.

23 Claims, 12 Drawing Sheets

(56) References Cited

U.S. PATENT DOCUMENTS

| | | | |
|---|---|---|---|
| 8,347,267 B2* | 1/2013 | Givoni et al. | 717/131 |
| 8,352,918 B2* | 1/2013 | Cuoq et al. | 717/131 |
| 8,355,895 B2* | 1/2013 | Sims, Jr. | 717/126 |
| 8,381,178 B2* | 2/2013 | Martino et al. | 717/132 |
| 8,521,499 B1* | 8/2013 | Rompaey et al. | 717/131 |
| 2006/0150160 A1* | 7/2006 | Taft et al. | 717/126 |
| 2007/0113292 A1* | 5/2007 | Kao et al. | 726/27 |
| 2009/0217248 A1* | 8/2009 | Bently et al. | 717/132 |
| 2011/0088023 A1* | 4/2011 | Haviv et al. | 717/155 |
| 2012/0159619 A1* | 6/2012 | Berg et al. | 726/22 |

OTHER PUBLICATIONS

Livshits, et al., "Merlin: Specification INference for Explicit Informatin Flow Problems"; 2009, ACM; [retrieved on Feb. 13, 2013]; Retrieved from Internet <URL:http://dl.acm.org/citation.cfm?id=1542485>;pp. 75-86.*

Livshits, "Improving Software Security with Precise Static and Runtime Analysis"; 2006, Standford University; [retrieved on Feb. 13, 2013]; Retrieved from Internet <URL:http://171.64.73.155/~livshits/papers/pdf/thesis-d.pdf>;pp. 1-229.*

Harvey, "A static secure flow analyzer for a subset of Java"; 1998, Naval Postgraduate School; [retrieved on Feb. 13, 2013]; Retrieved from Internet <URL:http://www.dtic.mil/dtic/tr/fulltext/u2/a343709.pdf>;pp. 1-85.*

Bossi, et al., "Modelling Downgrading in Informatino Flow Security"; 2004, IEEE; [retrieved on Feb. 12, 2013]; Retrieved from Internet <URL:http://ieeexplore.ieee.org/stamp/stamp.jsp?tp=&arnumber=1310741>;pp. 1-15.*

Doble, et al., "Data Flow Analysis of Embedded Program Expressions"; 2012, Australian Computer Society, Inc.; [retrieved on Sep. 3, 2013]; Retrieved from Internet <URL: http://dl.acm.org/citation.cfm?id=252113>;pp. 71-82.*

Saxena, et al., "ScriptGuard: Automatic Context-Sensitive Sanitizatin for Large-Scale Legacy Web Applications"; 2011 ACM; [retrieved on Sep. 3, 2013]; Retrieved from Internet <URL: http://dl.acm.org/citation.cfm?id=2046707>;pp. 601-614.*

Zhou, et al., "Security INformatin Flow Control Model and Method in MILS", 2012 IEEE; [retrieved on Sep. 3, 2013]; Retrieved from Internet <URL: http://ieeexplore.ieee.org/stamp/stamp.jsp?tp=&anumber=6406089>;pp. 591-595.*

Huang, et al., "Verifying Web Applications Using Bounded Model Checking", 2004 International Conference on Dependable Systems and Networks;[retrieved on Sep. 3, 2013]; Retrieved from Internet <URL: http://ieeexplore.ieee.org/stamp/stamp.jsp?tp=&anumber=1311890>;pp. 1-10.*

Baldwin, Doug, "Constructing Regular Expressions from DFAs", SUNY Geneseo Dept. of Computer Science, CSci 342, 2006, 4 pgs.

Christensen, Aske Simon, et al., "Precise Analysis of String Expressions", Proceedings of International Sttic Analysis Symposium, vol. 2695 of LNCS, 2003, 17 pgs.

Cytron, Ron, et al., "Efficiently Computing Static Single Assignment Form and the Control Dependence Graph", ACM Transactions on Programming Languages and Systems, vol. 13, No. 4, Oct. 1991, pp. 451-490.

Feldthus, Asger, et al., "The Big Manual for the Java String Analyzer", Aarhus University, Nov. 2009, 43 pgs.

Grove, David, et al., "A Framework for Call Graph Construction Algorithms", ACM Transactions on Programming Languages and Systems, vol. 23, No. 6, Nov. 2001, pp. 685-746.

Minamide, Yasuhiko, "Static Approximation of Dynamically Generated Web Pages", Proceedings of the 14$^{th}$ International Conference on World Wide Web, May 2005, pp. 432-441.

Mohri, Mehryar, et al., "Regular Approximation of Context-Free Grammars Through Transformation", Robustness in Language and Speech Technology, 2001, 14 pgs.

Wassermann, Gary, et al., "Sound and Precise Analysis of Web Applications for Injection Vulnerabilities", Proceedings of Programming Language Design and Implementation, Jun. 2007, 10 pgs.

* cited by examiner

|  | Integrity | Confidentiality |
|---|---|---|
| High | Untrusted | Secret |
| Low | Trusted | Public |
| Downgrading | Endorsement | Declassification |

FIG. 1

```
public void submitQuery(String userName) {
    userName = clean(userName);
    String query = "SELECT id FROM users WHERE name = ' " +
        userName + "'";
    execute(query);
}
public String clean(String input) {
    return input.replaceAll(" ; ", ""). replaceAll(" ' ", "");
```

FIG. 4

```
public void submitQuery(String userName) {
    userName = clean(userName);
    String query = "SELECT id FROM users WHERE name = ' "+
        userName + " ' ";
    execute(query);
}
public String clean(String input) {
    return input.replaceAll(" ; ", "").replaceAll(" ' ", "");
}
```

| User Interface | 592 |
|---|---|
| Report | 594 |

Sanitizer that does not verify:

clean() called from submitQuery() at line 2.

All other sanitizers verify.

A: any character

```
public class MyClass {
   static public void main(String args[ ]) {
     String a = "a";
     String b = "b";
     String r = nappend (a, b, 3);
} public void nappend(String x, String y, int n) {
   String r = null;
   if (n == 0) {
     r = x;
   }
   else {
     r = nappend(x + y, y, n-1);
   }
   return r;
  }
}
```

```
main(String)
    2. a = "a"
    3. b = "b"
    4. r = nappend (a, b, 3)
nappend(String)
    1. b1 = n == 0
    2. goto 6 if b1
    3. v1 = x + y
    4. r1 = nappend(v1, y, n-1)
    5. goto 8
    6. r2 = x
    7. goto 8
    8. r = phi (r1, r2)
    9. return r
```
FIG. 14
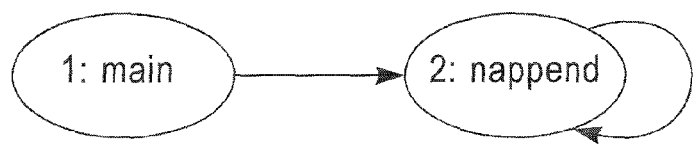
FIG. 15
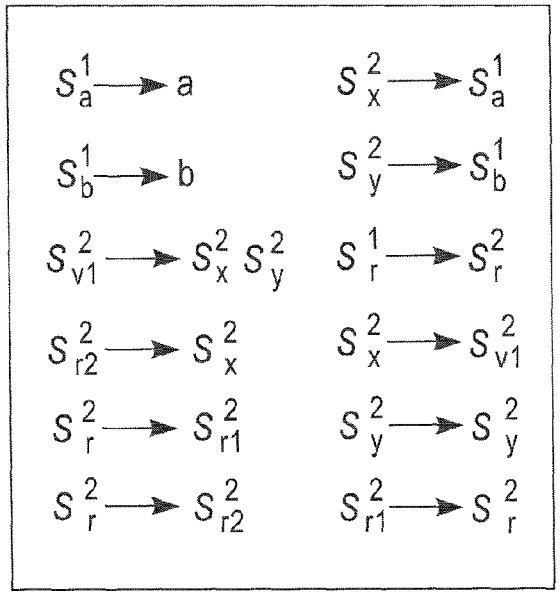
FIG. 16

VERIFICATION OF INFORMATION-FLOW DOWNGRADERS

BACKGROUND

This invention relates generally to information-flow downgraders and, more specifically, relates to verifying information-flow downgraders.

The information-flow security principle establishes that no "illicit flow" of information should be allowed in a program. A flow is illicit if the flow allows untrusted information to be used in a trusted computation (an integrity violation) or if the flow allows secret information to be entirely or partly revealed to unauthorized users (a confidentiality violation). Integrity and confidentiality can be seen as dual problems by simply stating that there should not be any flow of information from "high" to "low", where "high" means "untrusted" in integrity and "secret" in confidentiality, and low means "trusted" in integrity and "public" in confidentiality. See FIG. 1, which shows a table of information flows for integrity and confidentiality and downgrading types for the same.

Information can be tagged with information-flow labels. Typically, information-flow labels form a partially ordered set or even a lattice. If information-flow security was strictly enforced and no illicit flows of information were allowed, most programs would not work. To be information-flow secure, a program would have to be "partitioned" so that information tagged with a certain label (e.g., "label 1") can only flow to program points that have been tagged with labels higher than 1 (one). A program with these restrictions is very unlikely to be useful. For example, from an integrity point of view, a Web application is supposed to accept inputs from potentially untrusted users and use those inputs in trusted computation. As another example, an online banking program takes as input the account number and the password of a user (potentially untrusted information) and passes them to a backend database system where the account number and password are used in a trusted setting. Similarly, an online bookstore takes as input the user identification (ID) and password of the customer and the title of the book that the customer wants to buy (all potentially untrusted information), and uses them to complete a transaction.

From a confidentiality point of view, a Web application often releases data that has been computed based on secret information and, as such, should be considered secret as well: a banking application may reveal to any teller the last four digits of the social security number of any user; and an online bookstore may reveal to any shop assistant the last four digits of any customer's credit card number. Given that all these programs exhibit flows that allow "high" information to flow to "low" program points, all these programs would be rejected if information-flow security were simply enforced. To allow these programs to function, "high" information can be "downgraded" and become "low" enough to be used in "low" program points. Downgrading translates itself into "endorsement" in integrity and "declassification" in confidentiality (see FIG. 1). For example, once a program has verified that the user-provided input to a Web application is a properly formatted string, the program can endorse that input, which now becomes trusted enough to be used in a trusted computation. Similarly, once a program has verified that the information extracted from a secret is not sufficient to reveal the secret itself, the program can declassify the extracted information, which now can become public enough to be revealed to a public listener.

The part of the program that performs the downgrading is called an information-flow downgrader. A program can implement many information-flow downgraders and often there is no guarantee that a downgrader has been correctly implemented.

SUMMARY

In an exemplary embodiment, a method includes determining grammar for output of an information-flow downgrader in a software program, based at least in part on computer-readable instructions in the information-flow downgrader. The software program is configured to direct the output of the information-flow downgrader to a sink. The method includes determining whether the grammar of the output conforms to one or more predetermined specifications of the sink. The method also includes, in response to a determination the grammar of the output conforms to the one or more predetermined specifications of the sink, determining the information-flow downgrader is verified for the sink, wherein determining grammar, determining whether the grammar, and determining the information-flow downgrader are performed via static analysis of the software program. In other exemplary embodiments, apparatus and computer program products are also disclosed.

In an additional exemplary embodiment, an apparatus is disclosed that includes a user interface providing a report of a static analysis of a software program to a user. The report indicates a result of whether or not output of an information-flow downgrader in the software program conforms to one or more predetermined specifications of a sink in the software program.

BRIEF DESCRIPTION OF THE SEVERAL VIEWS OF THE DRAWINGS

The foregoing and other aspects of embodiments of this invention are made more evident in the following Detailed Description of Exemplary Embodiments, when read in conjunction with the attached Drawing Figures, wherein:

FIG. 1 shows a table of information flows for integrity and confidentiality and downgrading types for the same;

FIG. 4 shows an exemplary program to attempt to prevent the SQL injection shown in FIG. 3;

FIG. 14 is the program of FIG. 13 writing in a pseudo-SSA form;

FIG. 15 is a call graph for the program in FIG. 13; and

FIG. 16 is a complete set of production rules translated from the pseudo-SSA form shown in FIG. 14.

DETAILED DESCRIPTION

Before proceeding with a description of exemplary embodiments of the invention, it is helpful to consider further additional information about the area in which the invention might be practiced. According to the Open Web Application Security Project (OWASP), the top ten Web-application security vulnerabilities as of 2010 are as follows:

1. Cross-site scripting (XSS);
2. Injection flaws;
3. Malicious file executions;
4. Insecure direct object reference;
5. Cross site request forgery (CSRF);
6. Information leakage and improper error handling;
7. Broken authentication and improper session management;
8. Unsecure cryptographic storage;
9. Unsecure communications; and
10. Failure to restrict URL accesses.

Figure 2:
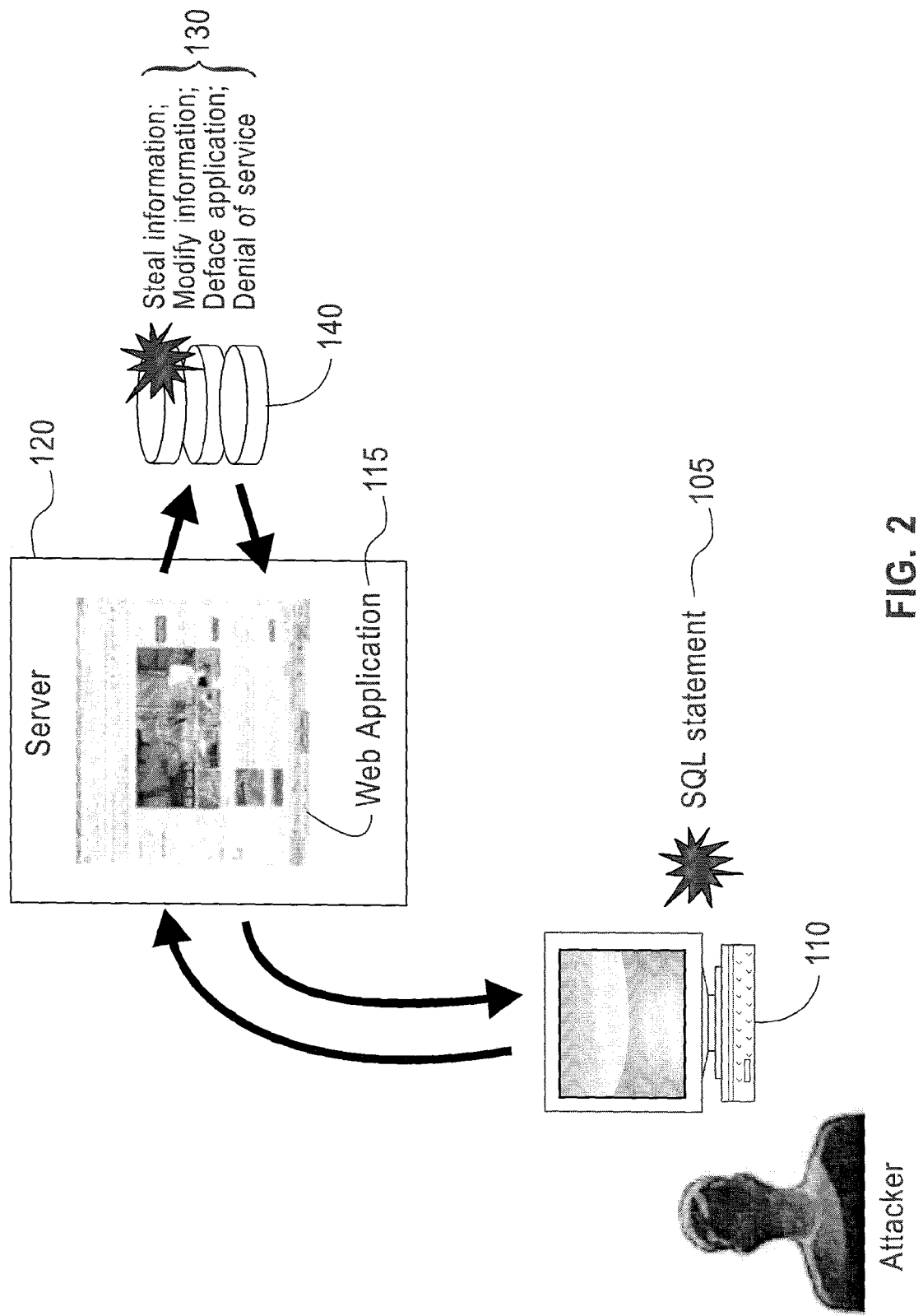
FIG. 2 shows an example of structured query language (SQL) injection.
Figure 3:
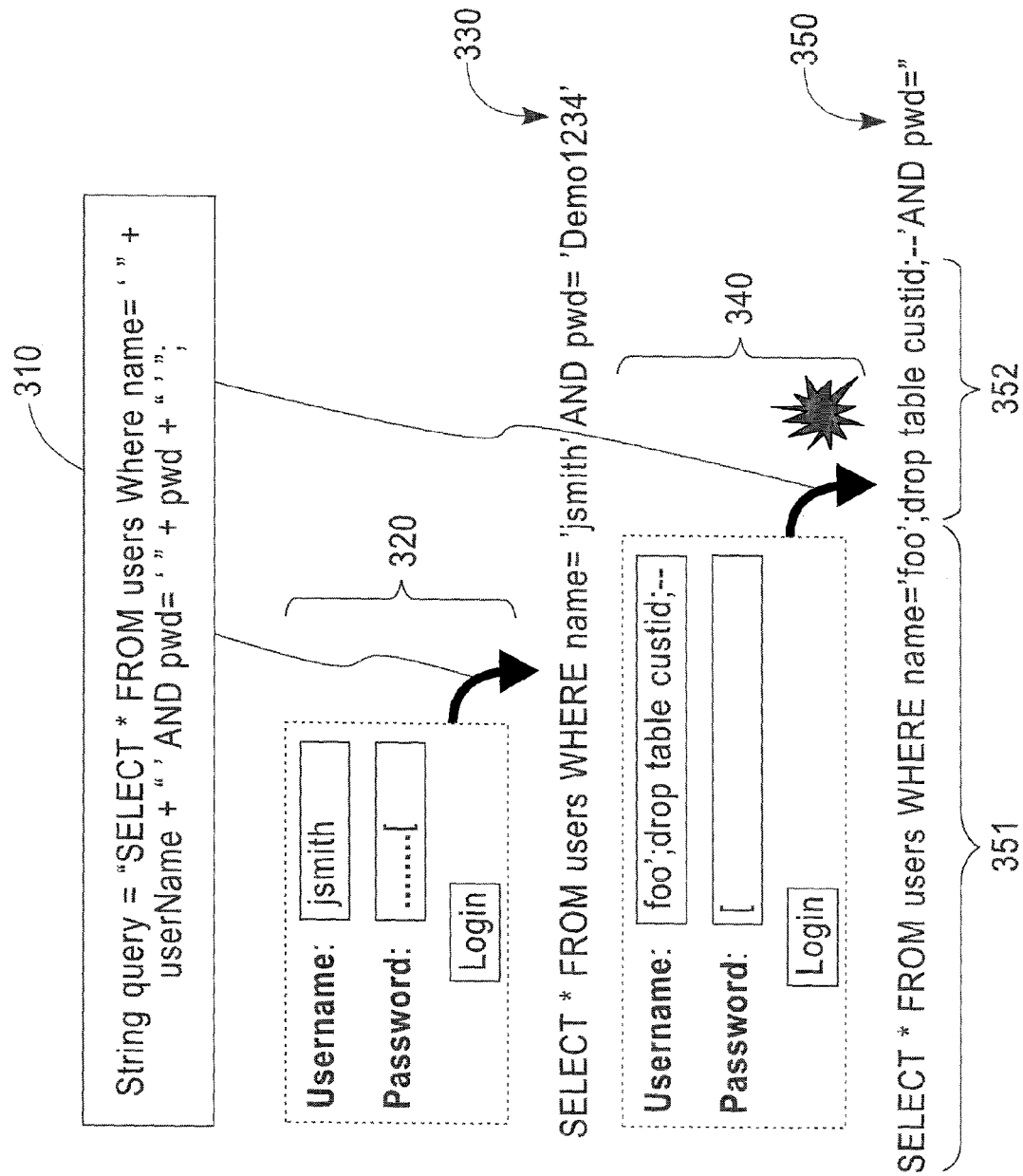
FIG. 3 shows an example of an SQL injection in code form.

Many of these vulnerabilities are related to information-flow downgraders. For instance, the second-highest vulnerability is injection flaws. One such type of injection flaw is illustrated in FIGS. 2 and 3. FIG. 2 shows an example of structured query language (SQL) injection, while FIG. 3 shows an example of an SQL injection in code form. In FIG. 2, it can be seen that an attacker, using computer 110 is attempting to log into Web application 115 on server 120. The attacker desires to be granted access to the database 140 or other backend information. The goals 130 of the attacker include stealing information, modifying information, defacing the application, and denial of service.

A normal username and password entry is shown by reference 320. The SQL query 310 examines the username and password and produces the proper result query 330. That is, the result query 330 is an appropriate SQL query to use to determine if the user with the name "jsmith" and password (pwd) "Demo1234" is allowed access to the Web application 115 and the database 140.

In order to create an injection flaw, the attacker submits a username "foo'; drop table custid;—", as shown by reference 340. This entry is interpreted by a Web application 115 as the text 350. The portions 351 and 352 of, the text 350 are potentially valid SQL queries, which may be executed and cause unexpected actions to occur.

To prevent this, one option is to call an information-flow downgrader such as the object "clean" in FIG. 4 to clean the text input to userName prior to reaching a sink (e.g., the execute( ) object) that uses the text in userName. In this example, the clean object is an integrity sanitizer, or "sanitizer". Information-flow downgraders herein can be either "integrity sanitizers" or "confidentiality declassifiers". See FIG. 1 for the relationship of these downgraders to the high and low integrity and confidentiality. In this example, the clean( ) object replaces all colons with no character and all apostrophes with no character. In this manner, the output of the clean( ) object conforms (at least potentially) to a specification of the SQL object, execute( ). In other words, the SQL object execute( ) should not receive the characters of colons and apostrophes.

Certain problems exist with this potential solution. The first is that information-flow downgraders such as sanitizers must conform to a sink-based specification. Additionally, information-flow downgraders such as sanitizers may be incorrect. For reasons described in more detail below, the sanitizer of the clean( ) object does not conform to a sink-based specification and therefore is incorrect.

In order to address these problems, an exemplary embodiment of the instant invention provides an automated verifier for information-flow downgraders so that a downgrader can be evaluated and its correctness verified. For each downgrader, the verifier (e.g., see the verification analysis tool in FIG. 5) takes as a parameter the (source or compiled) code of the information-flow downgrader and the information-flow label of the program point where the downgraded information is going to be used. Such information-flow label can be thought of as the specification of the "low" function (see FIG. 1) that will use the downgraded "high" information (see FIG. 1). An exemplary embodiment of the invention uses static analysis to verify the correctness of a downgrader. In particular, an embodiment uses static string analysis to compute the grammar of the string output by the downgrader and compare that string to the string required at a "low" function. If the grammar of the string output by a downgrader satisfies the specifications (e.g., requirements) of the "low" function, then the verification is passed.

This type of analysis has several advantages:
1. It does not require test cases or test case generation;
2. It has no false negatives;
3. It does not suffer from the limitations of dynamic analysis;
4. It does not require program deployment.

It is possible to validate at least the following:
1) Downgraders that modify an input string and output a string that is potentially different, but safer, than the input string; and
2) Downgraders that check an input string and return an error message if the input string is unsafe to be used in a "low" program point.

Figure 5:
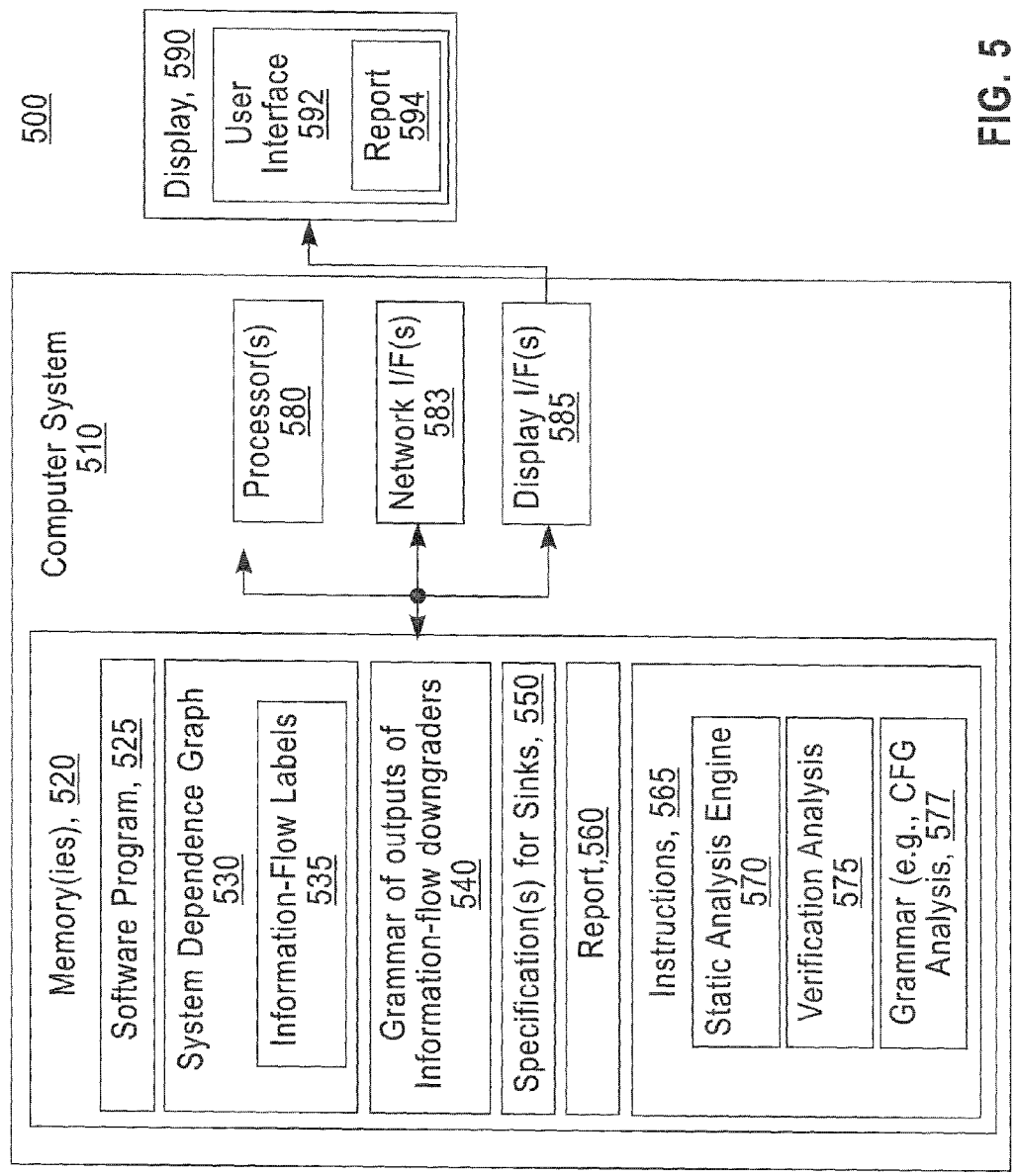
FIG. 5 shows a block diagram of a system for verification of information-flow downgraders.

Referring now to FIG. 5, this figure shows a block diagram of a system 500 for verification of information-flow downgraders. The system 500 includes a computer system 520 and a display 590. The display 590 includes a user interface 592 that shows a report 594. The display 590 is coupled to a display interface 585.

The computer system 510 includes one or more memories 520, one or more processors 580, one or more network interfaces 583, and one or more display interfaces 585. The one or more memories 520 include a software program 525, a system dependence graph 530, grammar 540 of the outputs of information-flow downgraders, specifications 550 for sinks, a report 560, and instructions 565. The instructions 565 include a static analysis engine 570, a verification analysis tool 575, and a grammar analysis tool 577. The instructions 565 are computer-readable code executable by the at least one processor 580 that cause the computer system 510 to perform one or more of the operations described herein. The system dependence graph includes information-flow labels 535.

In an exemplary embodiment, the static analysis engine 570 includes a static analysis framework known as Watson Libraries for Analysis (WALA), available as an open source product. The static analysis engine 565 takes the software program 525 and creates, e.g., the system dependence graph 530 including the information-flow labels 535. The software program 525 can be, e.g., object code, source code, byte code, library code, or application code, or some combination of these. Exemplary operations of the static analysis engine 565 are described in relation to FIGS. 6 and 7. The grammar analysis tool 577 operates on information-flow downgraders and creates a grammar 540 for each of the information-flow downgraders. Exemplary operations taken for grammar analysis (performed, e.g., by grammar analysis tool 577) are described in relation to FIGS. 11-16 below.

The verification analysis tool 575 uses the grammar 540 of outputs of the information-flow downgraders and the specifications 550 for sinks to determine whether or not the information-flow downgraders are verified with respect to their associated sinks. The information-flow labels 535 map portions of the software program 525 to sinks. Actions taken for verification (e.g., by verification analysis tool 575) are described in more detail in relation to, e.g., FIGS. 8, 9A, and 9B below. One possible output from the verification analysis tool 575 is a report 560, e.g., sent to a user via a wired or wireless network interface 583, or a report 594 that is displayed to a user. An exemplary report 594 is shown in FIG. 10.

Figure 6:
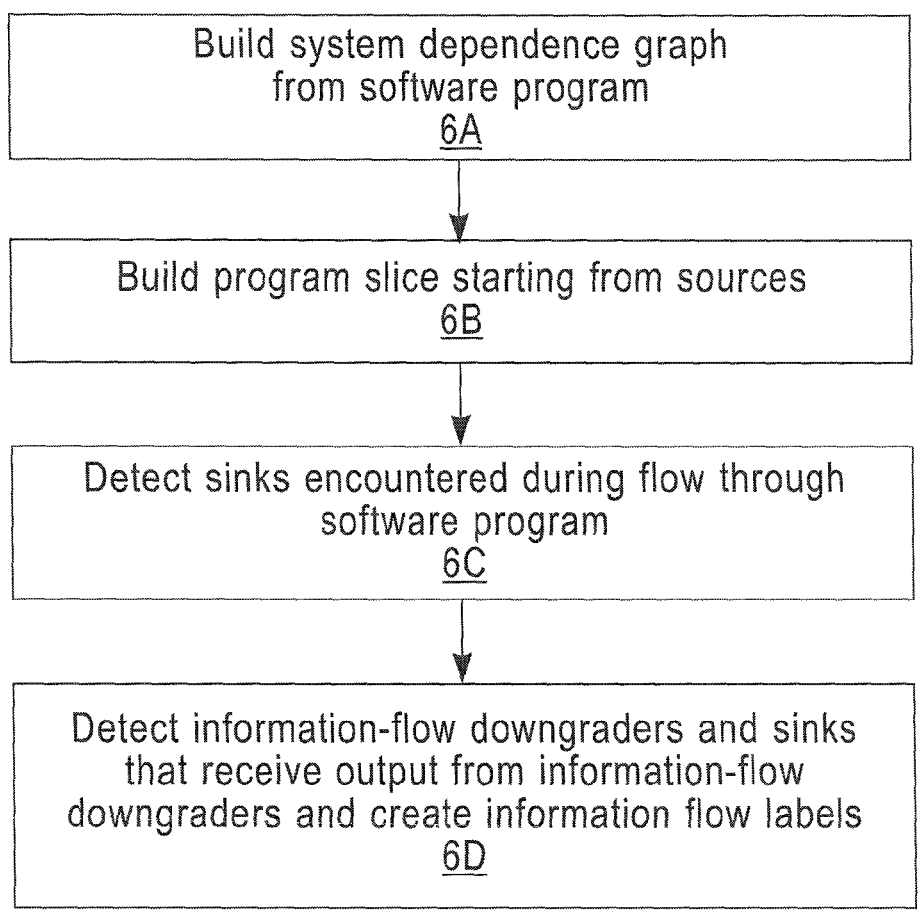
FIG. 6 shows a flowchart of an exemplary method for taint analysis.

FIG. 6 shows a flowchart of an exemplary method 600 for taint analysis, such as that performed by the static analysis engine 570. Taint analysis is only one type of analysis that the static analysis engine 570 might perform. In a taint analysis of a software program, information paths are tracked from untrusted methods and parameters (called "sources" herein) in the application layer 710 (see FIG. 7) into security-sensitive areas (called "sinks" herein) in the core layer 740. Other analyses include analysis for performance, deadlock detection, dead-code detection, etc.

Figure 7:
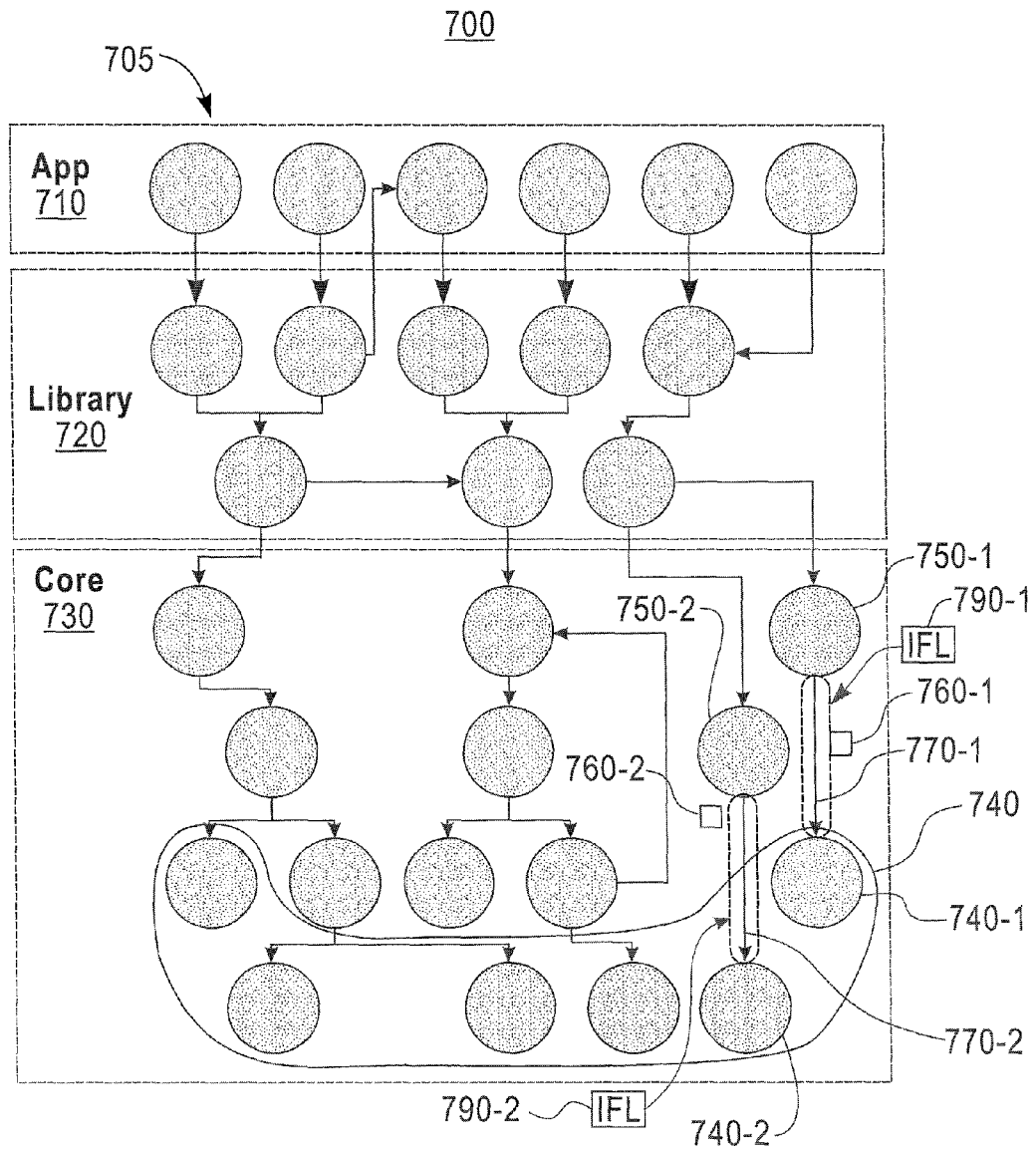
FIG. 7 is an illustration of a system dependence graph for a software program.

Method 600 begins in block 6A, when a system dependence graph is built from a software program 525. An exemplary system dependence graph 700 is shown in FIG. 7. There are a number of sources 705 shown in application layer 710. A library layer 720 and a core layer 730 are shown. The sinks 740 are the ending points of a series of edges (also called flows). Each circle illustrates a node (e.g., a portion) of the software program 525. In this example, two information-flow downgraders 750-1 and 750-2 are shown. Each of the information-flow downgraders 750-1, 750-2 produces an output 760-1, 760-2, respectively, that is an input to a respective sink 740-1, 740-2. The edges 770-1 and 770-2 are mapped via information-flow labels (IFLs) 790-1 and 790-2 (e.g., corresponding to information flow labels 535 of FIG. 5) to their corresponding information-flow downgraders 750-1 and 750-2 and the sinks 740-1 and 740-2.

In block 6B, a program slice is built, starting from sources 705. In block 6C, sinks 740 are detected that are encountered during a flow (or flows) though the software program 525. That is, the static analysis engine 570 operates to detect the sinks 740 while performing the taint analysis. In block 6D, detection is performed for information-flow downgraders and the sinks connected thereto that receive output from information-flow downgraders 750, and information-flow labels 790/535 are created.

Figure 8:
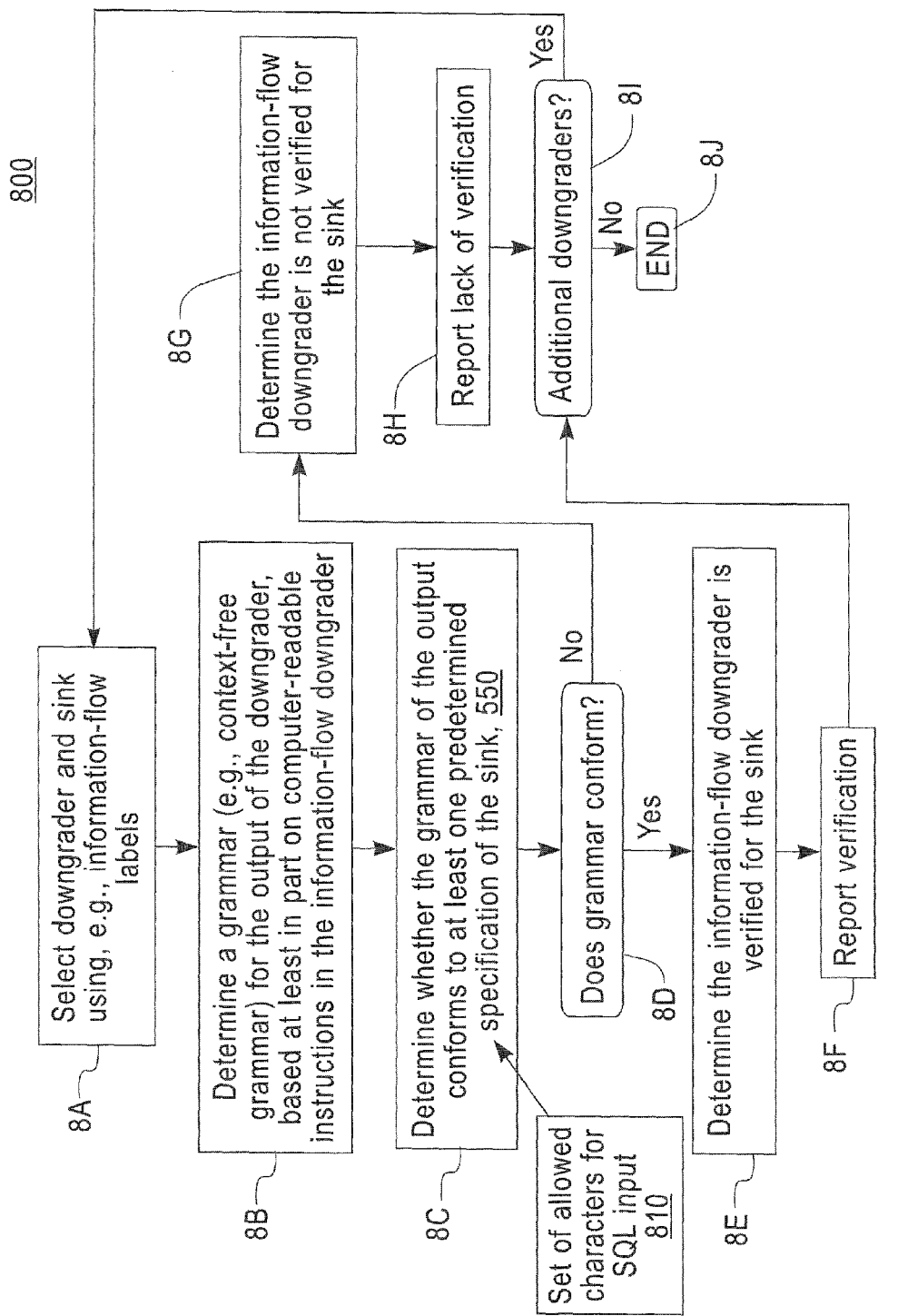
FIG. 8 is a flowchart of an exemplary method for verification of information-flow downgraders.
Figures 9A, 9B, 10:
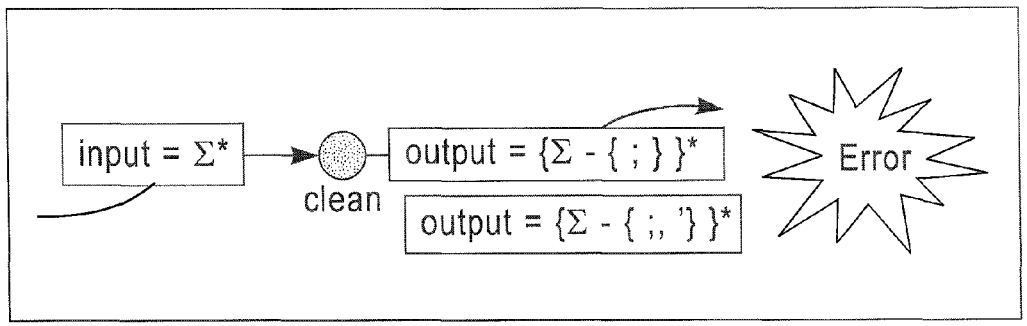
FIG. 9A is an example of a software program that uses a sanitizer and is a version of the program shown in FIG. 4.
FIG. 9B is an example of inputs and outputs to the sanitizer from FIG. 9A.
FIG. 10 is an example of a user interface that displays a report.
Figure 11:
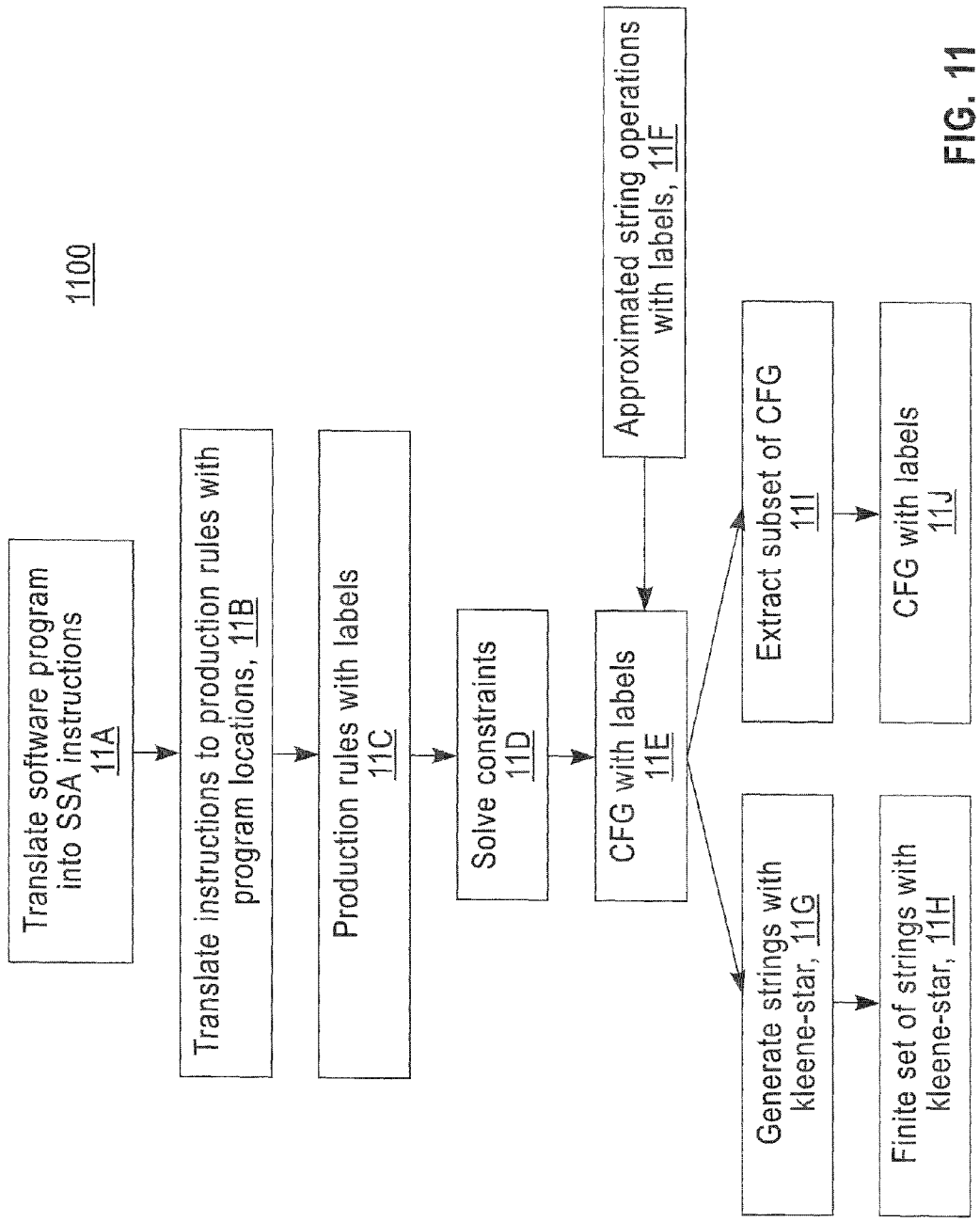
FIG. 11 is a flowchart of an exemplary method for string analysis with program locations.

Turning to FIG. 8, a flowchart is shown of an exemplary method 800 for verification of information-flow downgraders. Method 800 would be performed, e.g., by verification analysis tool 575, operating on the system dependence graph 530 (e.g., and other information described in relation to FIG. 7). In block 8A, a downgrader and corresponding sink are selected, e.g., using the information-flow labels 790/535. In block 8B, a grammar (e.g., context-free grammar, CFG) is determined for the output of the downgrader, based at least in part on computer-readable instructions in the information-flow downgrader. Determination of suitable grammar is described in reference to FIGS. 11-16.

In block 8C, it is determined whether the grammar of the output conforms to at least one predetermined specification of the sink. This block uses specifications 550 of sinks 740, such as the set 810 of allowed characters for SQL input.

In block 8D, it is determined if the grammar conforms to at least one predetermined specification of the sink. If the grammar conforms (block 8D=YES), in block 8E, it is determined that the information-flow downgrader is verified for the sink. Optionally, in block 8F, the verification can be reported, such as in a report 560, 594. The method 800 proceeds to block 8I.

If the grammar does not conform (block 8D=NO), in block 8G, it is determined that the information-flow downgrader is not verified for the sink. In block 8H, the lack of verification is reported to a user via, e.g., a report 560 or 594 or through any other technique (such as an error message).

In block 8I, it is determined if there are additional downgraders. If so (block 8I=YES), method 800 continues at block 8A. If not (block 8I=NO), the method 800 ends in block 8J.

Referring now to FIGS. 9A and 9B, FIG. 9A is an example of a software program that uses a sanitizer and is a version of the program shown in FIG. 4, while FIG. 9B is an example of inputs and outputs to the sanitizer from FIG. 9A. Referring to FIG. 9A, we assume that a correct sanitizer must eliminate both the semicolon (;) and apostrophe (') characters from the strings that it receives as inputs. This can be done by replacing such characters with the empty string (" "). However, if the sanitizer developer forgot to eliminate apostrophe characters from the input strings (which is indicated in FIG. 9A with a strikethrough on the instruction that removes the apostrophes), then the sanitizer is incorrect. Exemplary embodiments of the invention automatically detect such problems in sanitization code so that sanitizers can be automatically validated.

FIG. 10 is an example of a user interface 592 that displays a report 594. The report 594 in this example indicates that the sanitizer clean( ) does not verify, but all other sanitizers are verified. The report 594 is merely exemplary and can be modified in many ways.

FIGS. 11-16 relate to grammar analysis, and particularly context free grammar (CFG), performed, e.g., by grammar analysis tool 577. An introduction is given below regarding a grammar analysis, and then a more detailed description is given. Both the introduction and more detailed descriptions relate to method 1100 of FIG. 11, and blocks from this method are referred to in both descriptions.

The description below of grammar analysis relates to JAVA (a programming language), but is not in any way limited thereto. JAVA String Analyzers (JSAs) are known, but the instant invention improves upon these with at least one or more of the following techniques:

1) String analysis (such as a JAVA string analysis) is extended with labels that indicate program locations where string values are created or manipulated;

2) A mapping is calculated from string values to their corresponding definitions and operating program locations; and 3) A subset is calculated of string values that are created through specified program locations.

In an exemplary embodiment, the possible string values of a string expression are approximated by a CFG. The CFG is deduced by solving subset constraints (block 11D) among the sets of strings assigned to program variables. Consider the following JAVA program, which appends "a" to the string assigned to the variable a three times after initializing this variable with "a".

String $\alpha$="a";

for($i=0;i<3;i$++)

$\alpha=\alpha+$"a";

String $r=\alpha;$

The following three subset constraints can be obtained corresponding to the assignments in the program, where S(V) denotes a set of possible strings assigned to the variable v and the operator + is lifted to sets of strings.

$$S(\alpha) \supseteq \{\text{``}\alpha\text{''}\}$$

$$S(\alpha) \supseteq S(\alpha) + \{\text{``}\alpha\text{''}\}$$

$$S(r) \supseteq S(\alpha)$$

The solution of these constraints is obtained (block 11D) as a CFG by translating every S(V) to a nonterminal $S_v$ and $\supseteq$ to $\rightarrow$ as in production rules.

$$S_\alpha \rightarrow a$$

$$S_\alpha \rightarrow S_\alpha \alpha$$

$$S(\alpha) \supseteq \{\text{``}\alpha\text{''}\}$$

For example, the CFG with start symbol $S_v$ represents a solution for S(α) which yields the set of strings {"α", "αα", "ααα", "αααα", ...} and likewise $S_r$ represents a solution for S(r). Obviously, it contains strings that are never assigned to the variables α and r, since the instant string analysis completely ignores the condition of the "for" statement as of now.

When there is a program that uses predefined string operations such as String.substring as shown in the following program, a sound approximation is used for every string operation to translate a CFG to a CFG:

String α="xxα";

for(*int i*=0;*i*<3;*i*++)α=α+"α";

String *r*=α.substring(2);

Intuitively, soundness means that a resulting CFG computed by the string analysis contains all the actual strings arising at runtime. Soundness is formally defined as follows: f is s sound approximation for a string operation f iff (if and only if) S' ⊃ f(S) where S'={s'|s'=f(α), s∈S}. One of the methods to approximate predefined string operations is to use a transducer which is an automaton with output. It is well known that the image of a transducer is also a CFG. Other methods are homomorphisms on (Σ, +) where Σ is a set of characters and + denotes concatenation, functions that always return the same CFG yielding all the possible strings returned by corresponding predefined string operations, and so on. The following production rules with the approximated string operation substring(_, 2) are the ones obtained from the program above.

$$S_\alpha \rightarrow xx\alpha$$

$$S_\alpha \rightarrow S_\alpha \alpha$$

$$S_r \rightarrow \underline{\text{substring}}(S_\alpha, 2)$$

Figures 12, 13:
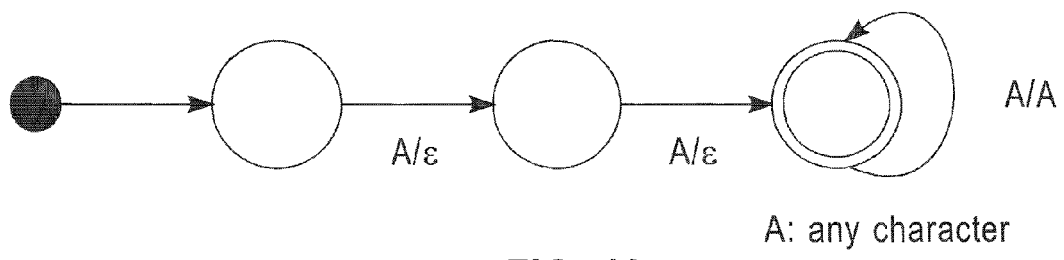
FIG. 12 is a representation of a transducer substring($\_$, 2)
FIG. 13 is a sample software program written in the JAVA language.

The approximated string operation substring(_, 2) is defined by the transducer shown in FIG. 12 and is a sound approximation for the string operation_.substring (2). By applying that transducer to the grammar, the grammar analysis tool 577 can obtain the following CFG which represents the set {"α", "αα", "ααα", "αααα", ...}.

$$S'_\alpha \rightarrow \alpha$$

$$S_\alpha' \rightarrow S_\alpha' \alpha$$

$$S_r \rightarrow S_\alpha'$$

Now that an introduction to grammar analysis has been given, this section describes an embodiment on how to implement the string analysis. The description provided in this section first describes intra-procedural string analysis, and then explains how to extend that to inter-procedural string analysis. The implementation details presented in this section assume that the string analysis has been implemented on top of the static analysis framework known as Watson Libraries for Analysis (WALA), available as an open source product from the Internet.

To describe the intra-procedural string analysis, consider the nappend method shown in FIG. 13. The first operation in the grammar analysis is to translate (block 11A of FIG. 11) the program into Static Single Assignment (SSA) faint as shown in FIG. 14, where pseudo notations are used for instructions v=val for an assignment of a value val to a variable or a field v, v=obj.func(v1, . . . , vn) for a method invocation with arguments v1, . . . vn, goto N for an unconditional jump to the label N, goto N if v for an conditional jump to the label N by the condition v. In addition, the SSA transformation introduces new variables and a φ-function, which is denoted by phi(v1, v2), to yield a program which has only one assignment to each variable. This characteristic of the SSA form is suitable to find data dependencies.

Basically, the assignments in SSA form are then translated (block 11B) to a set of production rules with string operations, except for conditional and unconditional jumps, in the same manner described above. In particular, v=phi(v1, v2) is translated into two production rules $S_v \rightarrow S_{v1}$ and $S_v \rightarrow S_{v2}$ so as to make it represent a union of the two sets of strings assigned to v1 and v2, respectively. According to this translation, the following production rules (block 11C) can be obtained from the pseudo SSA form of the nappend method.

$$S_{v1} \rightarrow S_X S_Y$$

$$S_{r1} \rightarrow \text{nappend}(S_{v1}, S_y, n-1)$$

$$S_{r2} \rightarrow S_X$$

$$S_r \rightarrow S_{r1}$$

$$S_r \rightarrow S_{r2}$$

These production rules are referred to herein as Equation A. For the inter-procedural string analysis, the intra-procedural string analysis is extended with the call graph information constructed by WALA, whose context-sensitivity can be flexibly controlled. Every variable in the SSA program is annotated with a call graph node (blocks 11B and 11C). After that, all the production rules are combined after removing production rules translated from method invocations such as $S_{r1} \rightarrow$nappend ($S_{v1}$, $S_y$,n-1). Instead, production rules are introduced representing dependencies between the parameters and the return value of a callee method and the variables of a caller method. For example, the following production rules are introduced if there is a context-insensitive call graph as shown in FIG. 15, where the superscript of each nonterminal represents the corresponding call graph node.

$$S_x^2 \rightarrow S_\alpha^1 S_x^2 \rightarrow S_{v1}^2$$

$$S_y^2 \rightarrow S_b^1 S_y^2 \rightarrow S_y^2$$

$$S_r^1 \rightarrow S_r^2 S_{r1}^2 \rightarrow S_r^2$$

FIG. 16 shows the complete set of the production rules obtained from the program. Such production rules can be interpreted as a set of constraints, which need to be solved by a constraint solver (block 11D). The following CFG is then obtained (block 11E) that predicts possible strings assigned to the variable r in the main method, where the start symbol is $S_r^1$.

$$S_r^1 \rightarrow a | S_r^1 b$$

In addition, a pointer analysis is leveraged in the translation from the program to the production rules with string operations in order to make the string analysis more precise. For this reason, block 11E in FIG. 11, which computes the CFG, receives as input a set of approximated string operations (block 11F). In particular, the pointer analysis helps the string analyzer (e.g., grammar analysis tool 577) to identify how constant strings flow to variables across methods and to identify whether the same objects are assigned to different variables in potentially different methods, even if those objects are dynamically created.

It is known that a CFG can be over-approximated by a regular grammar using certain algorithms described and a CFG can be translated to a regular expression through the transformation from the regular grammar to a finite-state automaton. This straightforward transformation is leveraged to generate a finite set of strings with kleene-star (block 11G), which is also a set of regular expressions without the choice operator. The only differences are in the transformation from a finite-state automaton to a regular expression as follows.

A set of labeled strings are used with kleene-star instead of a regular expression. When two transitions are collapsed into one transition, two labeled strings with kleene-star $s_1^{L_1}$ and $s_2^{L_2}$ are concatenated as $s_1 s_2^{L_1 \cup L_2}$ (block 11G). With the above transformations, the CFG shown in the previous section can be transformed to the following set of strings (block 11H).

$$\{``a^{\{1\}}", ``ab^{\{1,2\}}", ``abb*^{\{1,2\}}"\}$$

Additionally, it is desirable in an exemplary embodiment to extract a subset of an inferred CFG. In order to extract a CFG that contains all the possible string values constructed through certain specified program locations, all the characters are removed (block 11I) that do not have a label containing the specified program locations. For instance, when a CFG is extracted that is constructed through the method nappend from the CFG (Equation A), $a^{\{1\}}$ is eliminated and the following CFG is obtained (block 11J).

$$S_r^1 \rightarrow S_x^2 b^{\{1,2\}}$$

$$S_x^2 \rightarrow a^{\{1,2\}} | S_x^2 b^{\{1,2\}}$$

It is noted that providing two forms of output (see blocks 11H and 11J) offers the end user more flexibility because the analysis can display finite sets of strings with Kleene star as well as a CFG with labels.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or assembly language or similar programming languages. Such computer program code may also include code for field-programmable gate arrays, such as VHDL (Very-high-speed integrated circuit Hardware Description Language).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A processor-executed method, comprising:
    determining grammar for output of an information-flow downgrader in a software program, based at least in part on computer-readable instructions in the information-flow downgrader, the software program configured to direct the output of the information-flow downgrader to a sink, wherein determining grammar for output of an information-flow downgrader in a software program comprises translating instructions for the software program into production rules with program locations;
    in response to a determination of grammar for output of an information-flow downgrader in a software program, labeling the specified program locations;
    determining whether the grammar of the output conforms to at least one predetermined specification of the sink, wherein determining whether the grammar of the output conforms to at least one predetermined specification of the sink comprises determining the grammar of the output conforms to the at least one predetermined specification of the sink in response to all characters in the grammar being characters in a set of allowed characters specified for input to the sink; and
    in response to a determination the grammar of the output conforms to the at least one predetermined specification of the sink, determining the information-flow downgrader is verified for the sink,
    wherein determining grammar for output of an information-flow downgrader in a software program, determining whether the grammar of the output conforms to at least one predetermined specification of the sink, and determining the information-flow downgrader is verified for the sink are performed via static analysis of the software program.

2. The method of claim 1, wherein determining whether the grammar for output of an information-flow downgrader in a software program further comprises calculating a mapping from the labeling of program locations.

3. The method of claim 1, wherein determining the grammar further comprises determining context-free grammar for the output of the information-flow downgrader.

4. The method of claim 3, wherein determining the context-free grammar further comprises:
    solving at least one constraint for the production rules to determine the context-free grammar.

5. The method of claim 4, wherein:
    determining the context-free grammar further comprises prior to translating instructions for the software program into the production rules with the program locations, translating the instructions into static single assignment form;
    translating the instructions for the software program into the production rules with the program locations further comprises translating the instructions in static single assignment form for the software program into the production rules with the program locations;
    determining the context-free grammar further comprises, after solving, performing both of the following:
        generating a set of strings with kleene-star; and
        extracting a subset of the context-free grammar, wherein all characters in the context-free grammar that do not have a label containing specified program locations are removed.

6. The method of claim 1, further comprising in response to a determination the grammar of the output does not conform to the at least one predetermined specification of the sink, determining the information-flow downgrader is not verified for the sink.

7. The method of claim 6, further comprising in response to determining the information-flow downgrader is not verified for the sink, outputting indicia of a lack of verification for the information-flow downgrader.

8. The method of claim 1, wherein the information-flow downgrader comprises an integrity sanitizer.

9. The method of claim 1, wherein the information-flow downgrader comprises a confidentiality declassifier.

10. The method of claim 1, further comprising in response to the determination the grammar of the output conforms to the at least one predetermined specification of the sink, outputting an indication, suitable for viewing by a user on a display, of the determination the information-flow downgrader is verified for the sink.

11. A computer program product, comprising:
    a non-transitory computer readable storage medium having computer readable program code embodied therewith, the computer readable program code comprising:
        computer readable program code configured to determine grammar for output of an information-flow downgrader in a software program, based at least in part on computer-readable instructions in the information-flow downgrader, the software program configured to direct the output of the information-flow downgrader to a sink, wherein to determine grammar for output of an information-flow downgrader in a software program comprises translating instructions for the software program into production rules with program locations;

computer readable program code configured to determine whether the grammar of the output conforms to at least one predetermined specification of the sink, wherein to determine whether the grammar of the output conforms to at least one predetermined specification of the sink comprises determining the grammar of the output conforms to the at least one predetermined specification of the sink in response to all characters in the grammar being characters in a set of allowed characters specified for input to the sink; and computer readable program code configured to, in response to a determination the grammar of the output conforms to the at least one predetermined specification of the sink, determine the information-flow downgrader is verified for the sink, wherein the computer readable program code configured to determine grammar for output of an information-flow downgrader in a software program, to determine whether the grammar of the output conforms to at least one predetermined specification of the sink, and to determine the information-flow downgrader is verified for the sink is configured to be performed via static analysis of the software program.

12. The computer program product of claim 11, wherein determine the grammar further comprises determining context-free grammar for the output of the information-flow downgrader at least by:

solving at least one constraint for the production rules to determine the context-free grammar.

13. The computer program product of claim 12, wherein:

determining the context-free grammar further comprises prior to translating instructions for the software program into the production rules with the program locations, translating the instructions into static single assignment form;

translating the instructions for the software program into the production rules with the program locations further comprises translating the instructions in static single assignment form for the software program into the production rules with the program locations;

determining the context-free grammar further comprises, after solving, performing both of the following:

generating a set of strings with kleene-star; and extracting a subset of the context-free grammar, wherein all characters in the context-free grammar that do not have a label containing specified program locations are removed.

14. The computer program product of claim 11, further comprising computer readable code configured to, in response to a determination the grammar of the output does not conform to the at least one predetermined specification of the sink, determine the information-flow downgrader is not verified for the sink; and, in response to determining the information-flow downgrader is not verified for the sink, output indicia of a lack of verification for the information-flow downgrader.

15. The computer program product of claim 11, wherein the information-flow downgrader comprises one of an integrity sanitizer or a confidentiality declassifier.

16. The computer program product of claim 11, further comprising computer readable program code configured to, in response to the determination the grammar of the output conforms to the at least one predetermined specification of the sink, output an indication, suitable for viewing by a user on a display, of the determination the information-flow downgrader is verified for the sink.

17. An apparatus, comprising:

at least one processor; and at least one memory including instructions, the at least one processor configured, in response to executing the instructions, to cause the apparatus to perform at least the following:

determining grammar for output of an information-flow downgrader in a software program, based at least in part on computer-readable instructions in the information-flow downgrader, the software program configured to direct the output of the information-flow downgrader to a sink, wherein determining grammar for output of an information-flow downgrader in a software program comprises translating instructions for the software program into production rules with program locations;

determining whether the grammar of the output conforms to at least one predetermined specification of the sink, wherein determining whether the grammar of the output conforms to at least one predetermined specification of the sink comprises determining the grammar of the output conforms to the at least one predetermined specification of the sink in response to all characters in the grammar being characters in a set of allowed characters specified for input to the sink; and in response to a determination the grammar of the output conforms to the at least one predetermined specification of the sink, determining the information-flow downgrader is verified for the sink, wherein determining grammar for output of an information-flow downgrader in a software program, determining whether the grammar of the output conforms to at least one predetermined specification of the sink, and determining the information-flow downgrader is verified for the sink are performed via static analysis of the software program.

18. The apparatus of claim 17, wherein determining whether the grammar for output of an information-flow downgrader in a software program further comprises calculating a mapping from the program locations.

19. The apparatus of claim 17, wherein determining the grammar further comprises determining context-free grammar for the output of the information-flow downgrader at least by:

solving at least one constraint for the production rules to determine the context-free grammar.

20. The apparatus of claim 19, wherein:

determining the context-free grammar further comprises prior to translating instructions for the software program into the production rules with the program locations, translating the instructions into static single assignment form;

translating the instructions for the software program into the production rules with the program locations further comprises translating the instructions in static single assignment form for the software program into the production rules with the program locations;

determining the context-free grammar further comprises, after solving, performing both of the following:

generating a set of strings with kleene-star; and extracting a subset of the context-free grammar, wherein all characters in the context-free grammar that do not have a label containing specified program locations are removed.

21. The apparatus of claim 17, wherein the instructions further configure the at least one processor to cause the apparatus to perform at least the following: in response to a determination the grammar of the output does not conform to the at least one predetermined specification of the sink, determining the information-flow downgrader is not verified for the sink; and, in response to determining the information-flow downgrader is not verified for the sink, outputting indicia of a lack of verification for the information-flow downgrader.

22. The apparatus of claim 17, wherein the information-flow downgrader comprises one of an integrity sanitizer or a confidentiality declassifier.

23. The apparatus of claim 17, the instructions further configure the at least one processor to cause the apparatus to perform at least the following: in response to the determination the grammar of the output conforms to the at least one predetermined specification of the sink, outputting an indication, suitable for viewing by a user on a display, of the determination the information-flow downgrader is verified for the sink.

* * * * *